Figure 1:
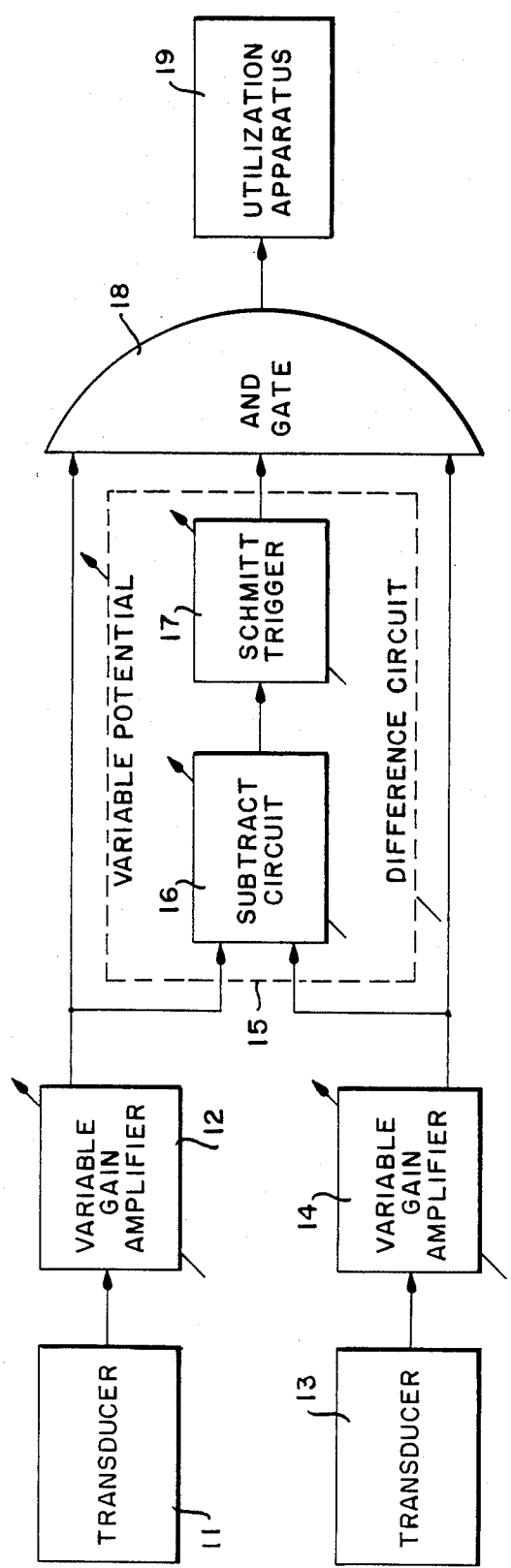

United States Patent [19]

Teel et al.

[11] Patent Number: 4,977,545

[45] Date of Patent: Dec. 11, 1990

[54] TARGET DETECTOR

[75] Inventors: Willis A. Teel; Louis F. Jones, both of Panama City, Fla.

[73] Assignee: The United States of America as represented by the Secretary of the Navy, Washington, D.C.

[21] Appl. No.: 547,717

[22] Filed: May 3, 1966

[51] Int. Cl.$^5$ ............................................. G01S 3/80
[52] U.S. Cl. ..................................... 367/124; 367/126
[58] Field of Search .................. 343/7 P, 7 F, 16 SD, 343/114.5, 119; 340/3, 6, 16; 367/124, 125, 126

[56] References Cited

U.S. PATENT DOCUMENTS

| | | | |
|---|---|---|---|
| 2,524,180 | 10/1950 | Schuck | 367/126 |
| 2,942,258 | 6/1960 | Priest | 367/90 |
| 2,987,700 | 6/1961 | Hawkins | 367/126 |
| 2,994,080 | 7/1961 | Varela | 342/94 |
| 3,024,441 | 3/1962 | Saxton | 367/125 |
| 3,097,356 | 7/1963 | Ruisinger | 342/92 |
| 3,178,679 | 4/1965 | Wilkinson | 367/12 |

Primary Examiner—Thomas H. Tarcza
Assistant Examiner—Daniel T. Pihulic
Attorney, Agent, or Firm—Harvey David; John Becker; Sol Sheinbein

[57] ABSTRACT

A radiant energy detector having a pair of receiving transducers, a pair of variable gain amplifiers connected to said transducers for amplifying the outputs thereof different amounts, a subtract circuit for producing a signal representing the difference of said amplifier gains, a Schmitt trigger which is triggered by said difference signal whenever it exceeds a predetermined value, and an And gate connected to the outputs of said pair of amplifiers and the output of said Schmitt trigger for producing a utilization signal whenever all thereof occurs simultaneously.

8 Claims, 1 Drawing Sheet

TARGET DETECTOR

The invention described herein may be manufactured and used by or for the Government of the U.S. of America for governmental purposes without the payment of any royalties thereon or therefor.

The present invention relates generally to passive energy detection systems, and in particular it is a method and means for producing a useful signal when a certain type and intensity of energy exists within and is received from a given highly localized volume of a predetermined environmental medium. In even greater particularity, it is an improved device for passively detecting the approach or presence of an acoustical energy-emanating submarine object, such as, for example, a torpedo or the like, within a predetermined volume of sea water.

In the past, well known target detection systems have been employed for substantially the same purposes as those of this invention. Such systems obviously include sonar systems, radar systems, and the like, which fall into either the passive or active category, and, of course, for many operational situations, they are highly satisfactory. However, in many instances, such systems leave something to be desired because they usually require that transducers or multi-element transducer arrays, having as many dimensions as the many wavelengths of the energy to be detected, be combined with relatively complex circuitry incorporating correlation and/or phase-comparison techniques. This, in turn, usually results in equipment that is complicated, burdensome from size and weight standpoints, costly to manufacture and maintain, vulnerable to rough handling, and of lesser reliability than is desired.

The present invention overcomes many of the disadvantages of the prior art devices, including most of those mentioned above.

It is, therefore, an object of this invention to provide an improved method and means for sensing the presence of a predetermined type of energy of predetermined intensity within a predetermined physical location.

Another object of this invention is to provide an improved method and means for determining that radiant energy is approaching from a certain direction.

Still another object of this invention is to provide an improved method and means for determining the approximate source position of an approaching energy.

A further object of this invention is to provide an improved target detector.

A further object of this invention is to provide an improved method and means for producing a warning signal when an approaching submarine vehicle arrives at an approximate predetermined position within a predetermined directionally known sector.

Another object of this invention is to provide an improved intrusion warning system.

Another object of this invention is to provide a target detector that is relatively simple of structure, is small in size and light in weight, and may be easily and economically manufactured, operated, and maintained.

Figure 2:
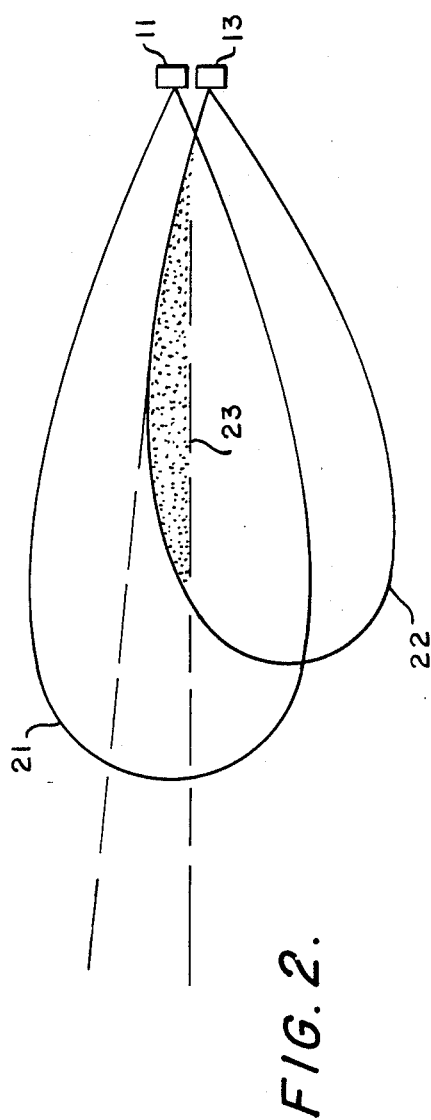

Other objects and many of the attendant advantages will be readily appreciated as the subject invention becomes better understood by reference to the following detailed description when considered in conjunction with the accompanying drawings wherein:

FIG. 1 is a functional block diagram of the target detector system constituting this invention; and FIG. 2 is an idealized representation of the radiant energy response patterns that may be effected by the preffered embodiment of the subject invention illustrated in FIG. 1.

Referring now to FIG. 1, the preferred embodiment of the subject invention shown therein discloses a first electroacoustical transducer 11 of the type that receives an acoustical signal from within a subaqueous medium and converts it into an electrical signal that is proportional thereto.

The output of transducer 11 is coupled to the input of a variable gain amplifier 12, the gain of which is susceptible to being manually adjusted by a human or other pertinent operator.

A second electroacoustical transducer 13 that is substantially identical to the aforementioned transducer 11 has its output coupled to the input of another variable gain amplifier 14 which is, likewise, substantially identical to the aforesaid variable gain amplifier 12.

The outputs of variable gain amplifiers 12 and 14 are coupled to the inputs of a variable potential difference circuit 15. This variable potential difference circuit 15 is the type of circuit which produces an output signal when and only when the voltage difference between the electrical input signals thereto equals or exceeds some manually preset voltage. Although any of many of such circuits may be used in this invention because they are well known or conventional per se, in the preferred embodiment herewith disclosed, it includes a subtract circuit 16 properly interconnected with a Schmitt trigger 17. As may readily be seen, subtract 16 has a pair of inputs which are respectively connected to the outputs of variable gain amplifiers 12 and 14 and an output which is connected to the input of Schmitt trigger 17. The output of Schmitt trigger 17 constitutes the output of variable potential difference circuit 15 and accordingly, it is coupled to one of a trio of inputs of an AND gate 18. The remaining pair of inputs of AND gate 18 are respectively connected to the outputs of the aforesaid variable gain amplifiers 12 and 14.

The output of AND gate 18 is coupled to the input of a utilization apparatus 19 which may, for example, be a sonar, a radar, a warning or alarm system, an energy or object intrusion detection system, a proximity fuze, a computer, a readout, or any other suitable device, apparatus, or system that may be combined therewith to an advantage.

The operation of the invention will now be discussed briefly in conjunction with both figures of the drawing.

It should, of course, be understood that the subject invention may be designed for and used in any appropriate, desired environmental medium, since so doing would obviously be well within the purview of one skilled in the art having the benefit of the teachings herewith presented. However, in order to simplify this invention disclosure, the preferred embodiment disclosed therein will be considered to be combined with a passive sonar type proximity fuze. Hence, the transducers thereof (that is, transducers 11 and 13) are of the electroacoustical type which are adapted for being disposed under water, so as to receive acoustical energy therefrom and convert it into electrical energy proportional thereto.

Transducers 11 and 13 of FIGS. 1 and 2 are adapted for receiving wavefronts of acoustical energy that emanate from a submarine target that is passing or approaching them. To facilitate determining the direction from which said acoustical energy wavefronts are coming, transducers 11 and 13 are disposed in contiguous relationship with each other with the receiving elements thereof preferably facing a known or indicated direction. Since the equipment for so doing is conventional and commercially available, and since it is not a part of this invention per se, it is not herewith disclosed.

The electrical signal outputs from transducers 11 and 13 are respectively applied to variable gain amplifiers 12 and 14 in order to increase the voltages thereof to more useful levels. As may be seen from the receiving lobes of radiant energy reception patterns 21 and 22, amplifiers 13 and 14 are intentionally set to have different gains which, of course, make the output voltage level of one greater than that of the other.

In order to generate another signal which is the predetermined voltage difference between the output signals from amplifiers 13 and 14, variable potential difference circuit 15 is connected to the outputs thereof. Generation of this signal is effected as a result of subtracting the output voltages from variable gain amplifiers 12 and 14 in such manner that when the voltage difference between the outputs of amplifiers 12 and 14 equals or exceeds the predetermined control bias voltage of Schmitt tigger 17, a certain output signal is produced thereby. This, then, is one of the output signal that are applied to AND gate 18.

The aforementioned difference voltage signal, of course, represents a receiving condition which effectively requires that the approaching target sound be within a predetermined location with respect to the receiving transducers when it is generated; and when this difference signal is generated by variable potential difference circuit 15 at the same time outputs occur at amplifiers 12 and 14, the approaching sound source (target) will, thus, be somewhere within shaded sector 23, as it is exemplarially shown in FIG. 2. In other words, when an output signal occurs at amplifier 12, the sonic energy emanating from an approaching target is located somewhere in a direction corresponding to receiving response lobe 21; when an output signal occurs at amplifier 14, the sonic energy emanating from the approaching target is located somewhere in a direction corresponding to receiving response lobe 22; and when outputs simultaneously occur at amplifiers 12 and 14 and variable potential difference circuit 15, the sonic energy from the approaching target is located somewhere in the sector corresponding to the shaded area 23 common to both receiving response lobes 21 and 22. This, then, gives an indication of the approximate direction of the approaching target itself.

The outputs from variable gain amplifiers 12 and 14 and variable potential difference circuit 15 are applied to the trio of input connections of AND gate 18 in order to insure that some signal above a zero voltage signal is being used as each of the voltage signals in the voltage difference processing. Hence, AND gate 18 insures that the sonic wavefronts are being received by both of the receiving transducers at some predetermined level of signal before a target indication is presented.

In view of that fact that variable gain amplifiers 12 and 14 may be manually adjusted, they may be adjusted so as to require some minimum threshold voltage to be present on the inputs thereto. This feature, of course, prevents the invention from responding to spurious noise signals (such as sea noises, fish noises, and the like) below a certain level and, thus, respond to a real target, because the sound emanating therefrom exceeds the aforesaid spurious noise levels. It may, therefore, be considered that amplifiers 12 and 14 each effectively contain thresholds, which, in turn, improves the signal-to-noise ratio of the processed signal and, hence, improves the target sensitivity of the invention. Of course, if so desired, actual threshold circuits may be inserted as warranted between the transducers and variable gain amplifiers, respectively, without violating the scope or the spirit of this invention, since so doing would merely be a matter of design choice of the artisan, in view of the above statements.

As suggested above, applying the aforementioned trio of input signals to AND gate 18 at the same time produces an output signal thereat which may be further processed by any suitable utilization apparatus 19. Also, as suggested above, numerous devices may be used as utilization apparatus 19 for many practical purposes; therefore, it is not the intent of the inventors that their invention be limited to any one particular type. However, it might be worthwhile to mention that sophisticated proximity fuze type devices may be used therefor, which facilitate the acquiring of an approaching torpedo or other submarine vehicle or object and the destruction thereof.

Obviously, many other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. Means for detecting the presence of radiant energy of predetermined intensity within a given volume of environmental medium comprising a in combination:
    a first transducer means for producing an electrical signal in response to predetermined radiant energy;
    a second transducer contiguously disposed with said first transducer means for producing an electrical signal in response to said predetermined radiant energy;
    first variable means connected to the output of said first transducer means for amplifying the electrical signal produced thereby a predetermined amount;
    second variable means connected to the output of said second transducer means for amplifying the electrical signal produced thereby a predetermined lesser amount than that effected by the aforesaid first variable electrical signal amplifying means;
    variable potential difference circuit means connected to the outputs of said first and second variable amplifying means for producing an output signal whenever the voltage difference between the electrical output signal therefrom exceeds a predetermined amount; and
    an AND gate having a trio of inputs and an output, with a pair of the inputs thereof respectively connected to the outputs of the aforesaid first and second variable amplifying means, with the remaining input thereof connected to the output of said variable potential difference circuit means, and with the output thereof adapted for being connected to a utilization apparatus.

2. The device of claim 1 wherein said first variable amplifying means has a gain that is greater than the gain of said second variable amplifying means.

3. The invention according to claim 1 further characterized by a utilization apparatus connected to the output of said AND gate.

4. A submarine target detector comprising in combination:
  a first electroacoustical transducer for receiving sonic energy within a subaqueous medium and producing an electrical output signal proportional thereto;
  a second electroacoustical transducer contiguously disposed with said first electroacoustical transducer for receiving said sonic energy within said subaqueous medium and producing an electrical output signal proportional thereto;
  a first variable gain amplifier connected to the output of said first electroacoustical transducer for amplifying the electrical output signal therefrom a predetermined amount;
  a second variable gain amplifier connected to the output of said second electroacoustical transducer for amplifying the electrical output signal therefrom a lesser amount than the amount effected by said first variable gain amplifier; and
  means connected to the outputs of said first and second variable gain amplifiers for generating a signal whenever the output voltage from said first variable gain amplifier exceeds the output voltage from said second variable gain amplifier by a preset amount above a predetermined threshold voltage.

5. The invention according to claim 4 further characterized by an AND gate having a trio of inputs and an output, with one of the inputs thereof connected to the output of said signal generating means, and with the other inputs thereof respectively connected to the outputs of the aforesaid first and second variable gain amplifiers.

6. The invention according to claim 5 further characterized by a utilization apparatus coupled to the output of said AND gate.

7. The device of claim 6 wherein said utilization apparatus is a proximity fuze adapted for acquiring and destroying an approaching submarine vehicle.

8. A method of detecting the presence of radiant energy of predetermined type and intensity comprising the steps of:
  receiving an incoming wavefront of said radiant energy at a first predetermined location within a given environmental medium and producing a first electrical signal in response thereto;
  receiving said incoming radiant energy wavefront at a second predetermined location within said given environmental medium that is contiguously disposed with the aforesaid first predetermined location and producing a second electrical signal in response thereto;
  amplifying said first and second electrical signals different amounts, respectively;
  generating a third electrical signal in response to said amplified first and second electrical signals when the first thereof exceeds the second thereof by a predetermined voltage; and
  producing a fourth electrical signal in response to the simultaneous reception of the aforesaid amplified first and second electrical signals and said third electrical signal.

* * * * *